Nov. 15, 1955   J. P. WILSON   2,723,678
VALVES
Filed June 5, 1950
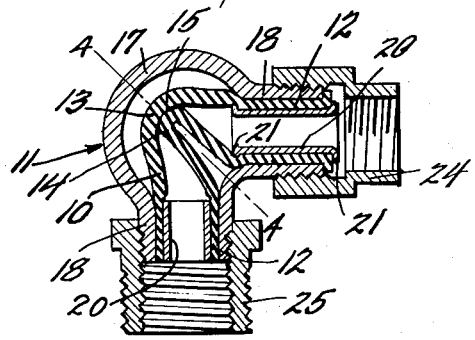
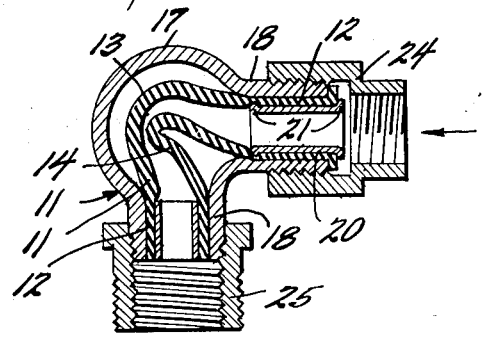
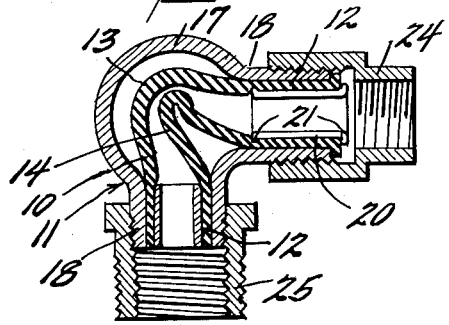
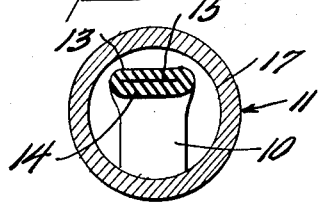
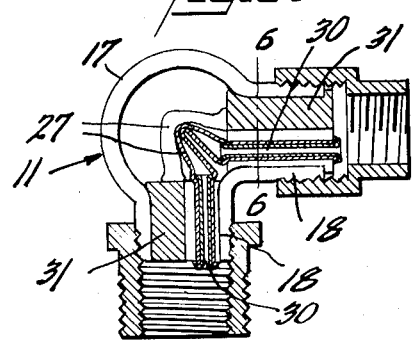
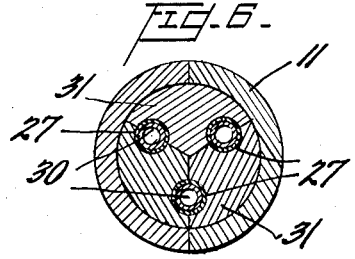
INVENTOR
J. Pearl Wilson,
BY Watson, Cole, Grindle & Watson
ATTORNEYS

United States Patent Office 2,723,678
Patented Nov. 15, 1955

2,723,678
VALVES

J Pearl Wilson, Jacksonville, Fla.

Application June 5, 1950, Serial No. 166,122

3 Claims. (Cl. 137—493)

This invention relates to improvements in valves, and more particularly to valves operable automatically in response to change in pressure conditions in a fluid system to control the flow of fluid.

It is an object of the invention to provide a valve which is normally closed to prevent fluid flow, but which is automatically opened to permit flow therethrough in either direction when the difference in pressure at the two sides of the valve exceeds a predetermined value. More specifically, it is an object of the invention to provide a new and improved two-way relief valve functioning in response to a pressure differential, whereby a substantial difference in pressure at opposite sides of the valve is automatically relieved.

A further object of the invention is to provide a valve of the character specified which is simple and inexpensive to construct and which may readily be adjusted to respond to slight differences in pressure, and which may be conveniently regulated to alter the pressure difference required for operation.

More specifically, it is an object of the invention to provide a two-way relief valve consisting essentially of a flexible tube and a fitting or holder for retaining the tube in a condition of flexure, whereby opposite walls of the tube may engage to prevent fluid flow therethrough, the position assumed by the tube being such that deformation of the tube occurs and flow is initiated whenever the difference in fluid pressure at opposite ends of the tube exceeds a selected value.

Further objects and features of the invention will be apparent from the following description taken in connection with the accompanying drawings, in which Figure 1 is a sectional view of a valve illustrating the principles of the invention;

Figures 2 and 3 are views corresponding to Figure 1 and showing the valve opened to fluid flow in opposite directions;

Figure 4 is a section taken on line 4—4 of Figure 1;

Figure 5 is a sectional view of a modification of the valve, and

Figure 6 is a section taken on line 6—6 of Figure 5.

In order to facilitate an understanding of the invention, the specific embodiments shown in the drawings are described hereinafter in detail. It will nevertheless be understood that restriction of the scope of the invention is not thereby intended, such changes and alterations being contemplated as would occur to one skilled in the art to which the invention relates.

In Figure 1 the valve is shown as comprising a flexible tube 10 and a fitting or holder, indicated generally at 11, functioning as a support to maintain the tube in the flexed condition. The tube 10 may consist of a length of standard tubing of rubber or other suitable material which is so flexed, as shown in Figure 1, that at a point intermediate its ends the outer side 13 thereof is intimately contacted by the inner side 14, the latter being caused to assume an abrupt fold. The juncture 15 between the two sides of the tube at the point of flexure defines substantially a straight line, as shown in Figure 4, and the tube is thus effectively sealed along this line to prevent fluid flow through the valve.

The holder 11 consists essentially of an enlarged body or bulb-shaped portion 17 and neck or stem portions 18, the axes of the latter defining an acute angle, preferably in the neighborhood of 90°. The central flexed portion of the tube 10 is disposed within the body portion 17 of the holder, and each end portion 12 of the tube 10 lies within and preferably extends slightly beyond the adjacent stem portion 18 of the holder, being clamped within the latter by sleeves 20. Thus each of the sleeves 20 is dimensioned to fit within an end portion 12 of the tube 10 and to press the latter into intimate contact with the stem 18. Preferably the sleeves 20 are upset slightly or flanged at their opposite ends as shown at 21, to minimize the possibility of unintentional displacement of the parts after assembly thereof. The necks 18 of the holder 11 are threaded externally to receive coupling members 24 and 25 whereby the valve may be connected in a fluid tight manner in a pipe line or between any two components of a fluid system.

It will be observed that in order to effect a proper seal at the juncture 15 of the inner and outer sides of the tube 10, the tube must be flexed to a sufficient extent, and that the extent of flexure may be varied by altering the length of tube which lies between the two necks 18 of the holder 11. It will also be appreciated that the value of the pressure differential required to open the valve may be initially regulated by adjusting this length. Thus if it is desired to increase the value of the pressure differential required to open the valve, one of the sleeves 20 is withdrawn, the adjacent end of the tube 10 is thrust further within the assembly 11, whereby the pressure exerted between the two sides 13 and 14 of the tube at the point of flexure is increased, and the sleeve 20 is thereafter replaced to retain the tube end portion in the adjusted position.

Figures 2 and 3 illustrate the manner in which the tube 10 is deformed in order to open the valve to fluid flow in the direction of the arrow whenever a predetermined difference in pressure exists at the two sides of the valve. Thus in Figure 2 the greater pressure is applied at the right-hand end of the valve, the inner side 14 of the flexed portion of the tube 10 is deformed downwardly, and the configuration of the outer side 13 is altered, so that the two sides of the tube 10 are separated to permit flow to occur. Similar deformation is represented in Figure 3, in which the higher pressure is applied at the lower end of the valve, and flow in the opposite direction is permitted. For convenience in manufacturing and assembling the holder, the latter may be formed in complementary sections which engage on a plane containing the axes of the necks 18, as represented at Figure 6.

It will be appreciated that the physical characteristics of the tube 10 are also a factor in determining the pressure differential at which the valve will open. Thus the rigidity of the tube 10, as affected by the thickness of the tube wall, the diameter of the tube, and the material of which the tube is formed, will affect the pressure applied between the two sides of the tube 14 and 15 at the zone of flexure. A tube material which has been found highly satisfactory is a synthetic rubber substitute sold under the generic name neoprene, prepared by polymerization of 2-chloro-1,3-butadiene, which is highly resistant to disintegration by heat and oil.

The differential pressure on which the valve will open also depends, as hereinbefore mentioned, on the angle of flexure of the tube at the juncture 15, and this angle may be altered by adjustment of the tube in the holder as described. In general, effective sealing is not secured when this angle is substantially greater than 90°, and at this angle the pressure difference required to open the valve is quite small. As the angle is reduced, the required differential pressure to open the valve increases, and for all practical purposes reaches a maximum when the angle of flexure is of the order of 45°. It will be appreciated, of course, that the exact angle at the point of flexure is difficult to measure, but it is roughly that angle which is defined by the tube axis in a zone close to the line of juncture 15 of the two sides 14 and 15 of the tube.

Since this angle can be varied to a considerable extent by adjustment of the tube in the holder as described, the angle defined by the axes of the holder necks 18 is not at all critical. For convenience in installation it is preferred that the necks form an angle of 90°, but this may be altered considerably without affecting the range through which the angle of flexure of the tube 10 may be varied.

In Figures 5 and 6 is illustrated a modification of the valve shown in Figures 1 to 4 inclusive, employing sereral flexed tubes within a single holder 11. Thus in these figures, the use of three flexible tubes 27 is illustrated, a sleeve 30, constructed and functioning similarly to the sleeves 20 of the earlier described embodiment, being inserted within the end portion of each of the tubes, to retain the latter in position in the holder. The holder may be constructed as previously described, but is supplied at each neck portion 18 with a plurality of sector-shaped inserts 31, conforming in number to the number of flexible tubes employed. These sector-shaped inserts 31 are so formed and dimensioned as to be received securely within the neck portion 18 of the holder, and adjacent inserts are recessed on their abutting faces to receive therebetween the end portion of a tube and its accompanying sleeve 30. It is, of course, essential that the holder 11 of this arrangement be formed in two longitudinal sections so as to be readily fitted around the sector members 31 and the assembled tubes. Each tube functions independently in the manner described with reference to the embodiment employing a single tube, and is similarly adjusted to vary the differential pressure at which fluid flow through the tube is initiated.

It will be perceived that although the structure of the embodiment shown in Figures 5 and 6 is somewhat more complex, it possesses certain advantages. Thus the several tubes can be independently adjusted to open at different pressure differentials. Thus when a given differential pressure is applied at the ends of a valve, flow may occur through only one of the three tubes, whereas increase in the differential pressure may result in the opening of two or more of the tubes as the critical differential pressure for each tube is exceeded. This provides more effective control of the volume of fluid flow through the valve at any given pressure differential than may be achieved with the single tube type of valve. By providing a sufficient number of tubes in a given valve unit, a delicate control may be achieved, such as is required in some applications of the invention.

Valves of the character described herein have been found especially useful in conjunction with the breathing outlets of vehicle fuel tanks. The valve is applied to the outlet and is adjusted to operate at a low pressure differential so as to permit the tank to breathe on an expansion or contraction of the contained fuel and vapor. Escape of fuel is prevented, however, if the tank is overturned or if leakage occurs as the result of the opening of a fuel feed line.

Another satisfactory use of the valve is in the water vapor intake of internal combustion engine water or water vapor injection systems. The valve is placed in the water feed line leading to the intake manifold. When the vacuum created within the manifold is great enough to exceed the critical pressure of the valve, water is fed to the manifold and thence to the engine. The multi-tubed modification is particularly applicable in this use in trucks, etc., where a relatively large variation of volume of water is needed over a wide range of manifold pressures.

These intended uses are meant in no way to limit the use of the valve, but are merely described by way of example.

Having thus described the invention, what is claimed as new and desired to be secured by Letters Patent is:

1. A pressure responsive fluid valve comprising a tube of resilient material, a rigid holder for said tube, said holder comprising a fitting having a body portion, and having neck portions defining an acute angle for receiving the end portions of said tube, means clamping the end portions of said tube in said neck portions with the intermediate portion of said tube unconfined and flexed at an acute angle, to effect engagement of opposite sides of said tube in the area of flexure to seal said tube, whereby a difference in fluid pressures applied at opposite ends of the tube in excess of said predetermined pressure effects deformation of said tube in the area of flexure thereof to permit fluid flow through said tube.

2. A pressure responsive fluid valve comprising a tube of resilient material, a rigid holder for said tube, said holder comprising a fitting having a body portion, and having neck portions defining an angle of about 90° for receiving the end portions of said tube, said neck portions being threaded for coupling in a fluid system, means clamping the end portions of said tube in said neck portions with the intermediate portion of said tube unconfined and flexed at an acute angle, whereby opposite sides of said tube are normally engaged in the area of flexure to seal said tube, said tube being deformed by a difference between the fluid pressures applied at the end portions thereof in excess of a predetermined value to effect deformation of said tube in the area of flexure thereof to permit fluid flow through said tube.

3. A pressure responsive fluid valve comprising a tube of rubber-like material, a rigid holder for said tube, said holder comprising a fitting having a body portion, and having neck portions defining an angle of substantially 90° for receiving the end portions of said tube, sleeves inserted in the end portions of said tube to clamp the latter in said neck portions with the intermediate portion of said tube unconfined and flexed at an acute angle, and with opposite sides of said tube engaged in the area of flexure to effect sealing of said tube, whereby the application of different fluid pressures at opposite ends of the tube effects deformation of said tube in the area of flexure thereof to permit fluid flow through said tube.

References Cited in the file of this patent

UNITED STATES PATENTS

| Number | Name | Date |
|---|---|---|
| 470,776 | Beehler | Mar. 15, 1892 |
| 729,423 | Scheiber | May 26, 1903 |
| 815,192 | Mercer | Mar. 13, 1906 |
| 2,002,835 | Rose | May 28, 1935 |
| 2,276,911 | Alward | Mar. 17, 1942 |
| 2,533,202 | Sturtevant | Dec. 5, 1950 |

FOREIGN PATENTS

| 103,277 | Switzerland | 1924 |